Jan. 15, 1935.　　　　F. YARDLEY　　　　1,988,258
VALVE
Filed July 27, 1932
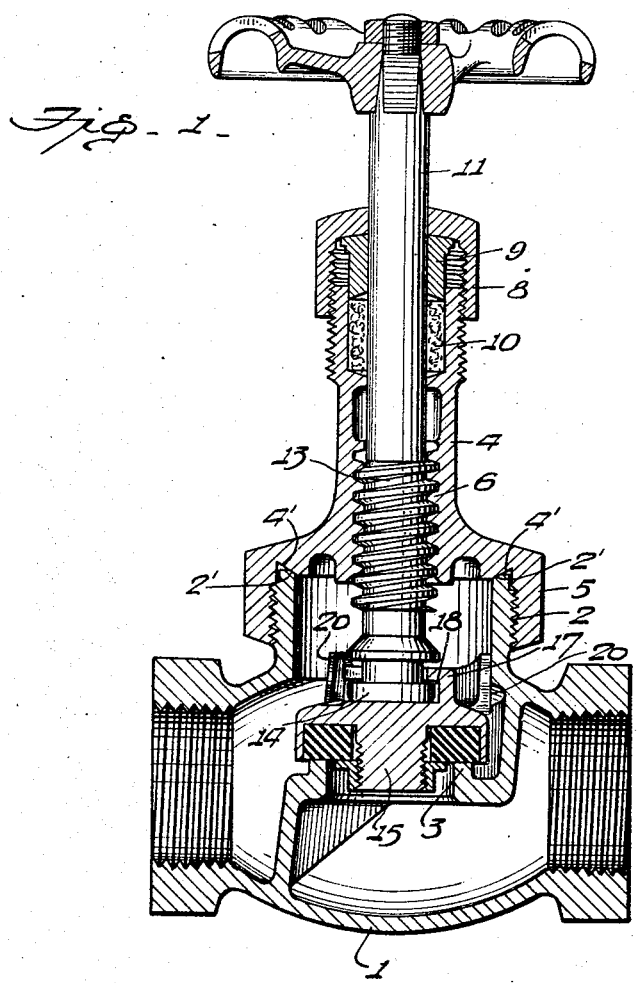
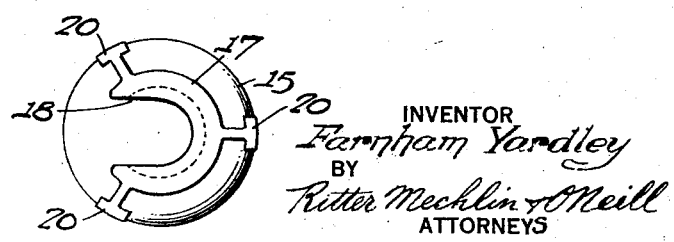
INVENTOR
Farnham Yardley
BY
Ritter Mechlin & O'Neill
ATTORNEYS Patented Jan. 15, 1935

1,988,258

UNITED STATES PATENT OFFICE 1,988,258

VALVE

Farnham Yardley, West Orange, N. J., assignor to Jenkins Bros., New York, N. Y., a corporation of New Jersey Application July 27, 1932, Serial No. 625,142

1 Claim. (Cl. 251—49)

The invention relates to certain improvements in valves of the type involving the head and slot or so-called slip-on connection between the stem and valve disk and has for its object to provide means to prevent the displacement of the valve disk from the stem, when the bonnet is removed from the casing, said means including radially disposed wings or guides on the back of the valve disk which normally engage the interior surfaces of the neck of the valve casing and which cooperate with the interior of the bonnet to prevent the accidental separation of the disk and spindle, when the bonnet is removed, the rim of the neck and the interior face of the bonnet being provided with coacting beveled surfaces which cooperate to prevent the deformation of the neck and the binding of the guide wings in the neck, when the bonnet is set up, said coacting beveled surfaces also serving as an additional seal between the bonnet and the neck to prevent leakage.

The invention is illustrated in the accompanying drawing, in which:—

Fig. 1 is a sectional elevation of a typical valve involving the novel construction.

Fig. 2 is a plan view of the valve disk.

Referring to the drawing, 1 indicates the valve casing, the valve illustrated being of the globe type with the usual valve seat 3. The valve casing is formed with an annular neck 2, which is exteriorly threaded to engage the interiorly threaded skirt 5 of a bonnet 4, which latter is exteriorly threaded on its upper end to receive the interiorly threaded cap 8, which engages the usual follower 9 to compress the packing 10 between the interior of the neck of the bonnet and the valve spindle, as is usual in valves of this type. The upper edge or rim of the neck 2 is formed with an inwardly and downwardly beveled surface 2', which is adapted to be engaged by a complementary beveled shoulder 4' formed on the under face of the bonnet. The purpose of these coacting beveled surfaces is to provide an additional seal between the bonnet and the neck of the casing, when the bonnet is screwed home, and, what is more important in the present case, is to prevent any distortion or deformation of the neck 2 from its normal annular shape, as will be hereinafter explained.

The spindle 11 is provided with screw threads 13, which engage the interior threads 6 in the bonnet and the lower end of the spindle is provided with a head 14 adapted to engage an open sided slot 18 formed in a boss 17 on the top of the valve disk 15, which permits of the valve disk being readily attached to and detached from the spindle.

In valve constructions of this general type, the valve disk is frequently accidentally separated from the spindle, especially when the bonnet is being removed from the casing for the purpose of adjusting, repairing or replacing the valve disk or for regrinding the valve seat, and one object of the instant invention is to prevent this separation of the valve disk from the spindle by providing the upper face of the back of the valve disk with a series of radially or upwardly projecting wings or guide members 20, the lateral edges of which normally engage the interior of the neck 2 and serve to guide the valve disk in its movement toward and from the seat 3. These wings are made sufficiently high, so that, when the valve disk is moved a short distance from its seat, the upper portions of the wings will lie within the plane of the lower edge of the skirt 5 of the bonnet and, when the latter is removed from the casing, the said guides will prevent lateral movement of the valve disk sufficient to separate the same from its slotted engagement with the headed end of the spindle, the distance between the lateral faces of the wings 20 and the interior of the skirt 5 of the bonnet being such as to prevent movement of the valve disk with respect to the head 4 sufficient to separate the head from the slot 18.

It is desired that a relatively close fit be maintained between the guides 20 and the interior wall of the neck, not only to accurately guide the valve in its movements, but to prevent destructive chattering of the valve, when the latter is employed in lines conveying fluid under high velocity, with a minimum of clearance between the wings and the neck. Any distortion or deformation of the interior of the neck from its normal annular shape, such as is frequently produced when the bonnet is screwed home, would cause the valve disk to bind in the casing and prevent its proper opening and closing movements. In order to prevent the squeezing in or distortion of the neck of the valve casing by the bonnet, the coacting beveled surfaces 2' and 4' on the upper rim of the neck and the inner face of the bonnet have been found to be most effective in maintaining the true circular form of the interior of the neck, thereby insuring a proper fit between the same and the lateral faces of the guides 20, so that the valve disk will be absolutely free from binding and from chattering.

While it is recognized that the slip-on type of valve disk is old per se, and it is also old in the art to provide a valve bonnet with a beveled rib to engage a coacting beveled surface on the rim of the neck, it is essentially new to combine these two features in a single valve structure, which latter will, therefore, possess the advantages of the slip-on type of valve disk and obviate the common disadvantage of this type, namely, the destructive chattering of the valve disk on the one hand and the sticking or freezing of the valve disk within the neck, when the latter is distorted by pressure exerted by the bonnet.

What I claim is:

A valve, comprising a casing having a neck provided with an exterior screw thread and an inwardly beveled rim, a one-piece bonnet having an interior screw thread to engage the threads on the neck and an inwardly beveled seat on its inner face engaging the beveled rim on the neck, said beveled surfaces being in sliding contact throughout a range of adjustment of said bonnet with respect to said neck whereby said neck is restrained against deflection, a valve spindle in threaded engagement with the bonnet and having a head on its lower end, a valve disk having a slotted boss on its back for slip-on engagement with the head on the spindle, and radially and outwardly extending wings on the disk having such clearance with the interior of the neck as both to guide and prevent chattering of the disk, said wings also cooperating with the interior of the bonnet to prevent displacement of the disk from the spindle when the disk is separated from its seat and the bonnet is removed.

FARNHAM YARDLEY.